Sept. 6, 1932.   J. B. N. CARDOZA   1,876,397
BRAKE CONTROL
Original Filed March 3, 1928
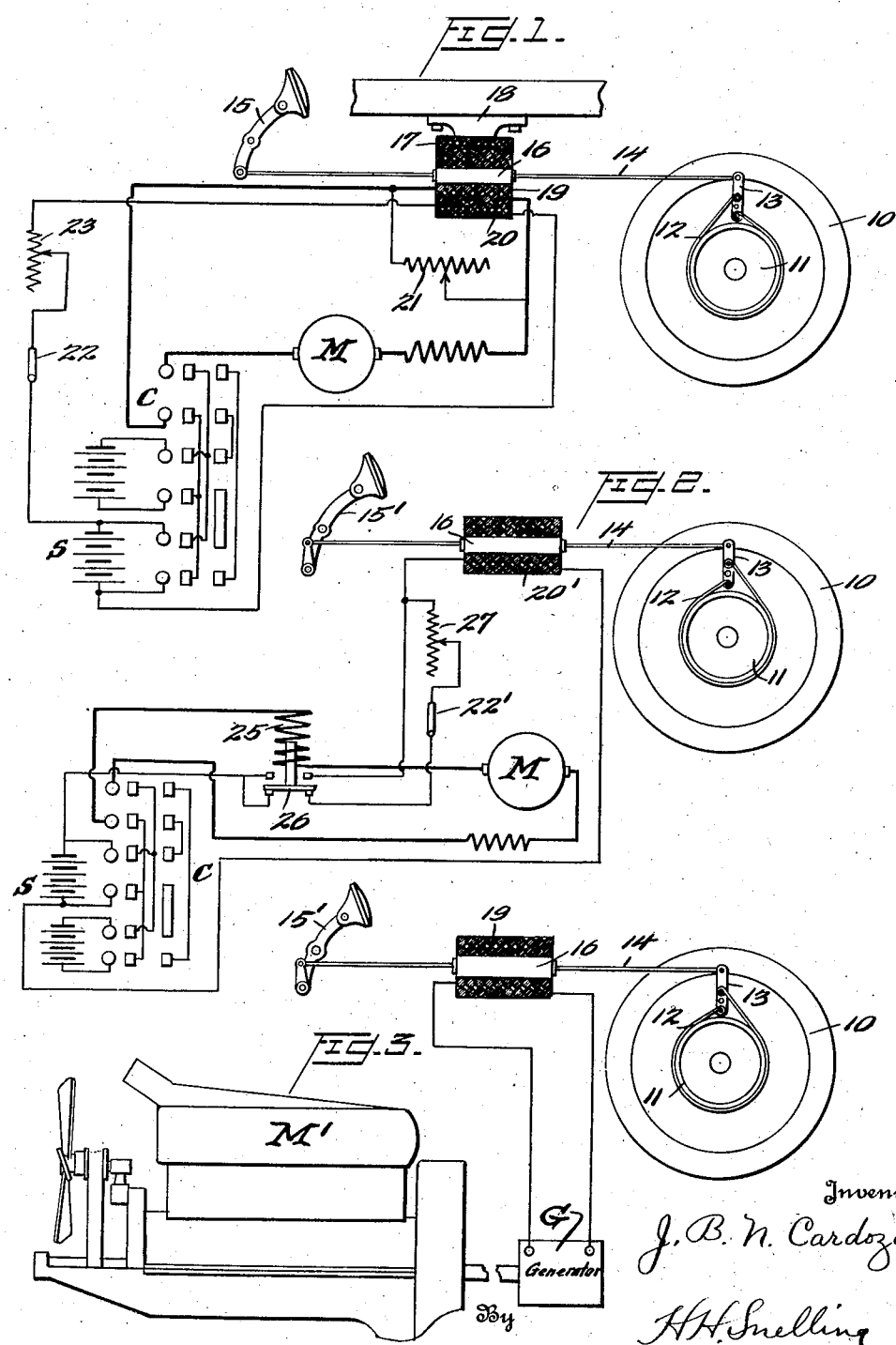

Patented Sept. 6, 1932

1,876,397

UNITED STATES PATENT OFFICE

JOHN BYRD NORRIS CARDOZA, OF NEW YORK, N. Y., ASSIGNOR TO BENDIX AVIATION CORPORATION, OF NEW YORK, N. Y., A CORPORATION OF DELAWARE

BRAKE CONTROL

Application filed March 3, 1928, Serial No. 258,857. Renewed September 18, 1931.

This invention relates to vehicle brakes and has particular reference to the control of brake mechanism of power driven shafts.

An object of the invention is to provide in connection with the usual brake mechanism for a driven shaft, for example, the driven shaft of a vehicle means to restrain the driver from applying the brakes while the propelling power is applied, to the end that the driver may not retard the movement of the vehicle unnecessarily and thereby cause useless consumption of energy. In practice it has been found that many drivers keep their feet on the brake pedals with sufficient pressure to apply the brakes, at least in some degree, even at times when the vehicle is being driven by the motors. This, of course, causes a useless expenditure of energy and unnecessary wear on the brake bands or shoes. The present invention provides an electrically operated device which acts on some part of the train of mechanism connecting the brake lever with the brake band and rendered effective when the vehicle is power driven to hold off the brakes with sufficient force to withstand any ordinary exertion of the driver, thereby reducing the possibility of the brakes being applied. In electric vehicle embodiments electric energy is thus very substantially conserved which results in materially increasing the operating radius of a vehicle to which the invention is applied on a single battery charge and moreover diminishes the wear and tear on the brake mechanism.

Referring to the accompanying drawing for a particular description of the invention:

Figure 1 is a diagrammatic view of a form of the invention shown in connection with the usual D. C. motor drive of an electric truck.

Figure 2 shows a modified form.

Figure 3 shows a still further modified form.

In Figure 1, 10 designates a wheel of an electrically propelled vehicle, and 11 the brake drum carried thereby. The brake band 12 is operated by a lever 13 which is connected by a rod 14 to a pedal lever 15, these parts being shown diagrammatically with no attempt to illustrate the precise construction found in practice. Fixed on rod 14 is the core 16 of a solenoid 17 which is carried by a bracket 18 secured to some suitable part of the vehicle frame. The solenoid 17 consists of two separate windings, an inner winding 19 composed of relatively coarse wire and an outer winding 20 of fine wire.

C designates as a whole the motor controller which is adapted to connect the two sections of a storage battery S either in parallel or in series with the propulsion motors m, the controller being indicated very diagrammatically with no attempt to illustrate the resistances and their connections which are used in practice to regulate the voltage applied to the motor terminals. Only one motor is illustrated, and it will be observed that the motor circuit (which is shown in relatively heavy lines) includes the coarse winding 19 of solenoid 17, this winding being preferably shunted by an adjustable resistance 21 so that it need carry only a selected part of the motor current and may, therefore, be of smaller capacity than would otherwise be necessary. It will be understood that when the motor circuit is closed, winding 19 is energized and holds the core 16 in the central position shown, in which position the brake band 12 is off.

The parts are preferably, although not necessarily, so proportioned that when the winding 19 is energized the brake rod 14 is held with sufficient force to prevent movement of said rod by any careless or unpremeditated pressure on brake pedal 15, it being thus rendered impossible for the driver to carelessly or unconsciously hold the brakes applied so long as the vehicle is being driven by the motors. In order to increase the efficiency of the solenoid the brake rod, or the portion thereof which passes through the core 16, may be of nonmagnetic material. Obviously, however, it is not necessary that the brake rod be passed through the core.

The function of the fine winding 20, which it will be observed is connected to the storage battery or a portion thereof independently of the motor circuit, is to attract the core 16 with enough force to hold the brakes off when no effort is exerted on foot pedal 15, but not with enough force to interfere with the proper application of the brakes. This fine winding, or its equivalent, is desirable in order that the brake bands may be held off, for example, when the vehicle is coasting. The circuit of winding 20 may include a switch 22 and an adjustable resistance 23. Switch 22 may be manually or automatically operable to open the circuit of winding 20 when the vehicle is standing idle. It is pointed out, however, that the current flow in the circuit of winding 20 may be of such low value that the energy consumed in said circuit is negligible.

The modification shown in Figure 2 resides in making the solenoid 20' of only one winding and in connecting this winding in a circuit separate from the motor circuit but controlled by the latter. It will be observed that the motor circuit includes the coarse winding 25 of a solenoid operated switch. As shown the motor circuit is open at controller C and the winding 25 is therefore deenergized and its bridging contact 26 is in its lower position, in which position it connects the solenoid 20' to a portion of battery S through a switch 22' and an adjustable resistance 27. When the motor circuit is closed, winding 25 will be energized, raising the bridging contact 26 and closing the circuit of solenoid 20' exclusive of resistance 27.

In this modification the solenoid is composed of many turns of fine wire so that the current flow therethrough, both when the motor circuit is closed and when the motor circuit is open, is of such small value that the energy consumption is negligible. The ampere turns however are sufficient when the motor circuit is closed and resistance 27 cut out, to prevent operation of the foot pedal 15 and unnecessary brake applications.

When the motor circuit is open and resistance 27 thrown in series with the solenoid winding, the ampere turns of the solenoid are cut down sufficiently to oppose no substantial impediment to the proper applications of the brakes and yet are effective to hold the brakes off when the truck is coasting.

In Figure 3 I have shown the invention as applied to an internal combustion engine M' which drives a generator G electrically connected with the coarse winding of the solenoid. As long as the generator is delivering current the core 16 is held in position to resist application of the brake pedal 15' to apply the brake band 12.

Changes may, of course, be made in the specific embodiments of the invention described and other substantially different modifications may be used without affecting the principle of the invention. It is not essential, for example, that the brake hold off device be effective in all closed positions of the controller, and of course it is not essential that the device be controlled by current in the motor circuit.

Having described my invention, I claim:

1. In an electrically propelled vehicle, the combination with brake mechanism and manual means for controlling the same, of electrically controlled means for preventing brake applications while current is flowing thru the motor circuit.

2. In an electrically propelled vehicle, the combination with brake mechanism and manual means for operating the same, of electromagnetic means acting on the brake mechanism and effective to prevent brake applications while current is flowing thru the motor circuit.

3. In an electrically propelled vehicle, the combination with brake mechanism and manual means for operating the same, of electromagnetic means in the motor circuit acting on the brake mechanism and effective to prevent brake applications while the motor circuit is closed.

4. In an electrically propelled vehicle, the combination with brake mechanism and manual means for operating the same, of means for holding off the brakes when the motor circuit is open ineffective to prevent manual application of the brakes and means effective to prevent manual application of the brakes when the motor circuit is closed.

5. In an electrically propelled vehicle, the combination with brake mechanism and manual means for operating the same, of electromagnetic means for holding off the brakes when the motor circuit is open ineffective to prevent manual application of the brakes, and electro-magnetic means controlled by the motor circuit effective to prevent brake applications when the motor circuit is closed.

6. In an electrically propelled vehicle, in combination with a storage battery, a propulsion motor, and brake mechanism, of a brake rod, a solenoid having a core secured to the brake rod and having a winding of relatively large diameter wire in the motor circuit and having a winding of fine wire in a circuit independent of the motor circuit, said solenoid being effective when both windings are energized to prevent movement of the brake rod and application of the brakes and being effective when the fine winding only is energized to hold off the brakes but not with sufficient force to interfere with the usual brake applications.

7. The combination with a self propelled vehicle, a propulsion motor, an electric circuit thru which current flows when the motor is being driven, and brake mechanism with manual means for operating same, of electromagnetic means for preventing brake applications while current is flowing thru said circuit.

8. In a self propelled vehicle having a motor, a brake mechanism, and manually controlled means for applying and releasing the brake mechanism, electrically controlled means for resisting movement of said manually controlled means while the motor is driving the vehicle.

9. In a vehicle, a motor for propelling said vehicle, brake mechanism, manually controlled means for applying and releasing the brake mechanism, and electro-magnetic means acting on the brake mechanism and effective to resist manual application of the brake while the motor is propelling the vehicle.

10. In a vehicle, an electric motor for propelling said vehicle, a brake mechanism, manual means for controlling said brake mechanism, and electrically controlled means for resisting movement of the manual means when the motor circuit is closed.

11. In a vehicle, an electric motor for propelling the vehicle, brake mechanism, manually controlled means for applying and releasing the brake mechanism, and means applying a definite amount of resistance to application of the brake mechanism when the motor is not receiving current and for resisting with a considerably greater strength application of the brake mechanism while the motor is receiving current.

12. In an electrically propelled vehicle, the combination with brake mechanism and manual means for operating the same, of electro-magnetic means independent of the motor circuit but controlled thereby acting on the brake mechanism and effective to resist brake applications while the motor circuit is closed.

13. The device of claim 12 in which the means is also adapted for holding off the brakes when the motor circuit is open ineffective to prevent manual application of the brakes.

14. In combination with an internal combustion engine, of brake mechanism and manual means for operating the same, a generator driven by said engine and electro-magnetic means controlled by said generator acting on said brake mechanism and effective to resist brake applications while the generator is delivering full current.

15. In an electrically propelled vehicle, the combination with brake mechanism and manual means for operating the same, of electro-magnetic means in the motor circuit acting on the brake mechanism and effective to prevent brake applications while the motor circuit is closed and means independent of the motor circuit for holding off the brakes when the motor circuit is open ineffective to prevent manual application of the brakes.

16. In an electrically propelled vehicle, the combination with brake mechanism, and manual means for operating the same, of electro-magnetic means in the motor circuit acting on the brake mechanism and effective to resist brake applications while current is flowing thru the motor circuit, and means for varying the flow of current thru said electro-magnetic means.

17. In a brake mechanism for a driven shaft, a prime mover therefor, means for mechanically applying the brake, an electric circuit having the electric flow therethrough controlled by the prime mover, and electro-magnetic means in the circuit for varying the resistance to mechanical brake application in accordance with the electric flow through the circuit.

18. In a brake mechanism for a driven shaft, a prime mover therefor, means for mechanically applying the brake, an electric circuit having the electric flow therethrough controlled by the prime mover, and electro-magnetic means in the circuit for increasing the resistance to mechanical brake application as the electric flow is increased.

In testimony whereof I affix my signature.

JOHN BYRD NORRIS CARDOZA.